(12) United States Patent
Sprague

(10) Patent No.: US 6,396,205 B1
(45) Date of Patent: May 28, 2002

(54) NONSPECULAR VISUAL DISPLAY AND METHOD

(75) Inventor: Robert A. Sprague, Saratoga, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/215,522

(22) Filed: Dec. 18, 1998

(51) Int. Cl.$^7$ .......................... H01J 29/10; H01J 29/16; H01J 29/12; H01J 31/00; G02B 27/10
(52) U.S. Cl. .................. 313/477 R; 313/461; 313/465; 313/466; 313/474; 359/623; 359/296
(58) Field of Search ..................... 445/24, 58; 313/461, 313/465, 466, 474, 477 R, 479, 110, 113, 112; 345/107; 428/323, 320.2, 402.2, 402.21; 346/21; 156/332, 298, 300; 359/296, 540, 623, 538; 365/127; 264/4, 232, 343, 7

(56) References Cited

U.S. PATENT DOCUMENTS

| | | | |
|---|---|---|---|
| 2,143,946 A | * | 1/1939 | Hunter ..................... 427/163.4 |
| 2,326,634 A | | 8/1943 | Gebhard et al. |
| 2,354,018 A | | 7/1944 | Heltzer et al. |
| 2,354,048 A | | 7/1944 | Palmquist |
| 2,354,049 A | | 7/1944 | Palmquist |
| 2,422,256 A | * | 6/1947 | Phillippi ................. 359/538 X |
| 3,567,307 A | * | 3/1971 | Rideout et al. ............. 359/541 |
| 3,795,435 A | | 3/1974 | Schwab |
| 3,915,771 A | | 10/1975 | Gatzke et al. |
| 4,082,426 A | | 4/1978 | Brown |
| RE29,742 E | | 8/1978 | Tung |
| 4,104,102 A | * | 8/1978 | Eagon et al. ............... 156/298 |
| 4,117,192 A | | 9/1978 | Jorgensen |
| 4,126,854 A | | 11/1978 | Sheridon |
| 4,143,103 A | | 3/1979 | Sheridon |
| 4,261,653 A | | 4/1981 | Goodrich |
| 4,367,920 A | | 1/1983 | Tung et al. |
| 4,438,160 A | | 3/1984 | Ishikawa et al. |
| 4,511,210 A | | 4/1985 | Tung et al. |
| 4,569,857 A | | 2/1986 | Tung et al. |
| 4,678,695 A | | 7/1987 | Tung et al. |
| 4,688,900 A | | 8/1987 | Doane et al . |
| 4,721,649 A | | 1/1988 | Belisle et al. |
| 4,725,494 A | | 2/1988 | Belisle et al. |
| 4,810,431 A | | 3/1989 | Leidner |
| 4,919,521 A | | 4/1990 | Tada et al. |
| 5,155,607 A | | 10/1992 | Inoue et al. |
| 5,251,048 A | | 10/1993 | Doane et al. |
| 5,262,098 A | | 11/1993 | Crowley et al. |
| 5,344,594 A | | 9/1994 | Sheridon |
| 5,389,945 A | | 2/1995 | Sheridon |
| 5,469,020 A | | 11/1995 | Herrick |
| 5,604,027 A | | 2/1997 | Sheridon |
| 5,894,367 A | * | 4/1999 | Shreidon ..................... 359/623 |
| 6,054,208 A | * | 4/2000 | Rega et al. .................. 428/323 |

FOREIGN PATENT DOCUMENTS

FR 2161301 7/1973

OTHER PUBLICATIONS

Lawrence L. Lee, "A Magnetic Particles Display", *IEEE Transactions on Electron Devices,* vol. ED 22, No. 9, Sep. 1975, pp. 758–765.

N. K. Sheridon and M. A. Berkovitz, "The Gyricon—A Twisting Ball Display", *Proceedings of the SID,* vol. 18/3 & 4, 1977, pp. 289–293.

A. Chiang, D. Curry and M. Zarzychi, "A Stylus Writable Electrophoretic Display Device", *SID 79 Digest,* pp. 44–45.

M. Saitoh, t. Mori, R. Ishikawa and H. Tamura, "A Newly Developed Electrical Twisting Ball Display", *Proceeding of the SID,* vol. 23, No. 4, 1982, pp. 249–250.

* cited by examiner

*Primary Examiner*—Nimeskumar D. Patel
*Assistant Examiner*—Mack Haynes
(74) *Attorney, Agent, or Firm*—Oliff & Berridge, PLC

(57) ABSTRACT

A nonspecular reflective visual display having a plurality of display elements with a substantially thin conformal layer of encapsulation material placed on a surface of the display elements. The conformal layer of encapsulation material diffusely reflects light incident upon the display, thereby eliminating glare.

29 Claims, 3 Drawing Sheets

NONSPECULAR VISUAL DISPLAY AND METHOD

INCORPORATION BY REFERENCE

The following patents and patent applications are herein incorporated by reference U.S. Pat. No. 4,126,854 to Sheridon, U.S. Pat. No. 4,143,103 to Sheridon; U.S. Pat. No. 5,604,027 to Sheridon; U.S. patent application Ser. No. 08/960,865 entitled "TWISTING CYLINDER DISPLAY" filed Oct. 30, 1997; U.S. patent application Ser. No. 08/960,868 entitled "A TWISTING CYLINDER DISPLAY USING MULTIPLE CHROMATIC VALUES" filed Oct. 30,1997; U.S. patent application Ser. No. 09/711,935 entitled "MONOLAYER GYRICON DISPLAY"; U.S. patent application Ser. No. 08/713,936 entitled "HIGH REFLECTANCE GYRICON DISPLAY"; U.S. patent application Ser. No. 08/716,675 entitled "GYRICON DISPLAY WITH INTERSTITIALLY PACKED PARTICLE ARRAYS"; and U.S. patent application Ser. No. 08/713,325 entitled "GYRICON DISPLAY WITH NO ELASTOMER SUBSTRATE".

BACKGROUND OF THE INVENTION

1. Field of Invention

The invention relates to visual displays. More particularly, the invention relates to nonspecular, reusable, paper-like, gyricon or twisting-particle type or other visual displays and method.

2. Description of Related Art

Paper is a preferred medium to present and display text and images. A reason for paper being a preferred medium is the many advantages that are realized with the use of paper as a display medium. For example, paper is thin, lightweight, portable, flexible, foldable, cost efficient, high contrast, reusable, basically permanent, and can easily be configured into a multitude of shapes. In addition, paper does not have any limitations on size, other than practicality, and as such, can be used as display media such as, for example, sticky notes or such, maps and billboards, to name a few. Furthermore, paper is capable of maintaining a displayed image without the need for a power source, such as, for example, batteries and other such stored energy sources. In addition, paper can be read in ambient light, as well as marked upon with any number of implements, such as, for example, a pen, pencil, paintbrush, printers, photocopiers, and the like.

Additionally, one feature of using paper as a display medium is paper does not suffer from specular reflection. In other words, there is no mirror-like or direct reflection of light from a light source off the viewed surface of paper like that found in conventional cathode-ray tube (CRT) displays. Specularly reflected light on a television or computer screen, for example, produces an annoying glare such that a viewer must reposition his head to not look at the direct reflection of light. In contrast, because the viewed surface of paper is usually rough, for example, light is scattered diffusely by the viewed surface so that the viewer can look directly at the paper in a comfortable manner.

However, although paper has many advantages as a display medium, paper is not well suited for real-time display purposes. Real-time imagery from computer, video, and other sources cannot be displayed by means other than, for example, a CRT display or a liquid-crystal display (LCD). Unfortunately, most real-time display media lack many of the desirable advantages of paper, such as, for example, being lightweight, thin, portable, physically flexible, and the ability to retain a displayed image in a stable manner without a power source. Furthermore, because most real-time display media use a flat glass display surface, such media specularly reflect light and produce an annoying glare. As such, attempts have been made to combine the desirable qualities of paper with those of real-time display media in order to provide a display that offers the best of both worlds. One such display is electric paper.

Like paper, electric paper can be written on and erased, can be read in ambient light, and can retain information in the absence of an electric field or other external retaining force. Also, like ordinary paper, electric paper can be made in the form of a lightweight, flexible, durable sheet that can be folded or rolled into tubular form about any axis and conveniently placed into a shirt or coat pocket, and then later retrieved, restraightened, and read substantially without loss of information. Yet, unlike paper, electric paper possibly can be used to display imagery in motion. Thus, electric paper is adaptable for use in computer systems, television, signs and a host of other applications within office, industrial and domestic settings.

One such form of electric paper is a gyricon display, also called a twisting-element display, rotary element display, particle display, dipolar particle light valve, and the like. Briefly, a gyricon display includes a plurality of optically anisotropic particles, such as, for example, spheres, each of which can be selectively rotated to present a desired image to an observer. For example, a gyricon display can incorporate rotational elements each having two distinct halves, e.g., one half may be black, while the other half is white.

The rotational elements are embedded in a sheet of optically transparent material that contains a plurality of cavities and is permeated by an optically transparent dielectric fluid. The fluid-filled cavities accommodate the rotational elements, one element per cavity, so as to prevent the elements from migrating within the sheet. Each element has a distinct electrical characteristic so that the elements are electrically as well as optically anisotropic. Thus, an element can be selectively rotated within its respective cavity by application of an electric field, so as to present either the black or the white half to an observer viewing the surface of the sheet, for example. However, as with most real-time display media, electric paper displays also typically have a substantially transparent flat surface that subjects a viewer to the annoying glare associated with the specular reflected which prevents the viewer from seeing the diffuse light scattered off the surface of the rotational elements.

Many attempts have been made to solve the problem of specular reflection. An example of such a solution is the roughening of the viewed surface of the display media, as seen in such displays as, for example, automatic teller machines, hand-held calculators and laptop computers. However, the added scattering in the dark regions of the display and the distortion of the image viewed through the rough surface are considered to significantly degrade the performance of the display. Additionally, certain real-time display media, such as a CRT, cannot roughen the viewed surface because the integrity of the flat surface is weakened, thereby subjecting the CRT to breakage.

SUMMARY OF THE INVENTION

The invention provides a nonspecular visual display and method in which the display achieves an appearance much like paper.

In one aspect, the invention uses a substantially thin encapsulation layer that conforms to the shape of elements in the display. The conformal layer of encapsulation material of the display achieves a paper-like appearance because there is no specular reflection of light produced by the conformal layer. In other words, light is diffusely reflected by the surface of the conformal layer.

In another aspect of the invention, microencapulated display elements are formed on a substrate. Since there is no top layer covering the display elements, ambient light is not specularly reflected by the display.

These and other aspects of the invention will be described in or be apparent from the following description of specific embodiments.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
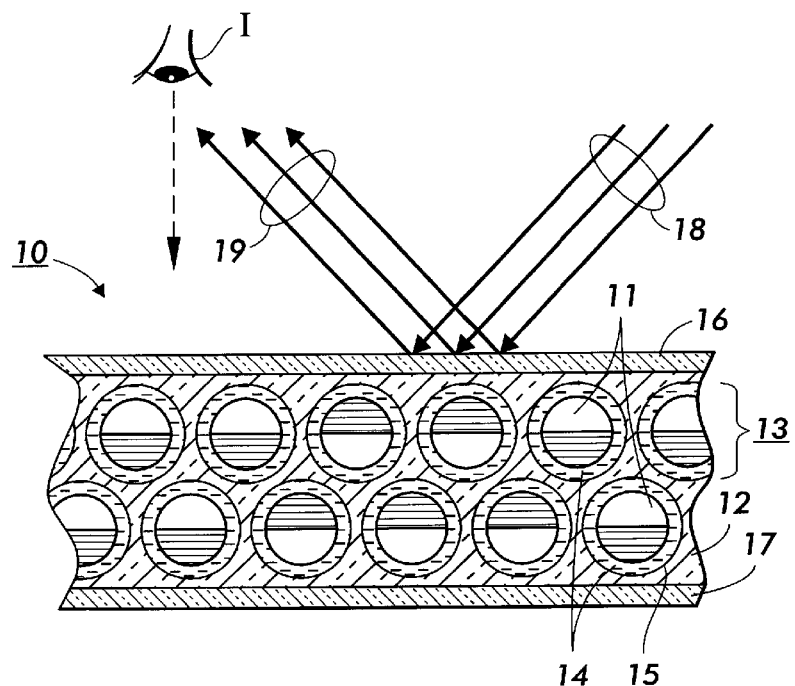
FIG. 1 is a cross section of a conventional gyricon display.

Typically, known gyricon displays are made up of various types of display or rotating elements. U.S. Pat. No. 4,126,854 describes a twisting element display panel 10 shown in FIG. 1. U.S. Pat. No. 4,143,103 discloses a method of making the twisting element display 10. The display 10 shown in these patents initially has a plurality of display elements 11 mixed with an uncured, optically transparent material 12, such as, for example, an elastomer. The uncured material 12 is then cured, thereby providing a solid display panel 13 in which the display elements 11 are fixed so that the display elements 11 cannot rotate or move translationally.

After the material 12 is cured, the display panel 13 is placed in a dielectric liquid plasticizer 14. The material 12 absorbs the plasticizer 14 so that the display panel 13 swells and cavities 15 are formed around each of the display elements 11. The cavities 15 are filled with the plasticizer 14 allowing rotation, if desired, of the display elements 11, while allowing essentially no translational movement of the display elements 11. The plasticized material is then bonded between two protective sheets of plastic or glass 16 and 17. One or both of the sheets 16 and 17 is transparent.

To use the display 10 as an electrically writeable display, a number of addressing mechanisms (not shown) known in the art are used to cause the display elements 11 to rotate in conjunction with an image based electric field pattern (not shown). The electric field pattern may be accomplished by, for example, depositing a charge on the surface of the display 10 with a stylus or by adding a transparent electrode pattern to the top or bottom surface of the display 10, which is electrically addressed. In all such cases, the difference in electrical charge between the differently colored portions of the display elements 11 cause each element 11 to rotate differently in response to the applied electric fields, as depicted in FIGS. 1–5, thereby forming ran image like pattern.

However, independent of the addressing technique, when the light 18 is incident upon the display 10, because the upper sheet 16 is substantially flat, a portion of the light 18 specularly reflects off the sheet 16 of the display 10 to produce an annoying glare to a viewer at I. The glare causes a viewer to reposition his eyes so as not to look at the directly reflected light 19.

The invention described herein improves visual displays by substantially eliminating the glare associated with specular reflection by applying a substantially thin conformal layer of encapsulation material across a surface of display elements near the upper surface of the display panel. The inventive structure achieves a visual display 20 having an appearance very much like paper.

Figure 2:
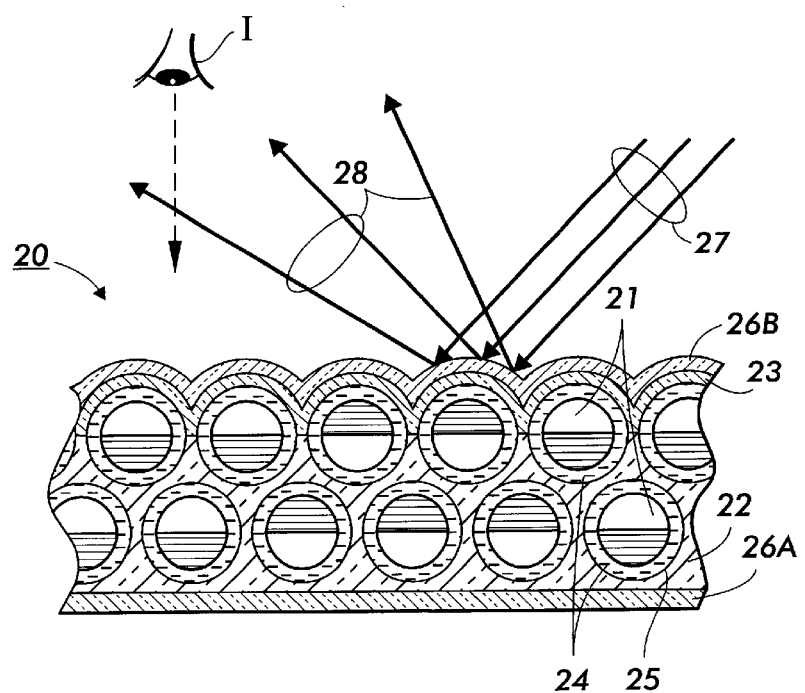
FIG. 2 is a cross section of an embodiment of a visual display in accordance with the invention.

As shown in FIG. 2, a plurality of display elements 21 are disposed on a base layer 22 of encapsulation material such that a top layer of the display elements 21 are partially immersed in the material 22. After the display elements 21 are so disposed, a substantially thin conformal layer 23 of encapsulation material is deposited over an exposed surface of the display elements 21. The thickness of the conformal layer 23 of encapsulation material must be substantially thinner than the width of the display elements 21 so that the conformal layer 23 does not planarize, but instead conforms to the shape of the display elements 21. For example only, if the display elements 21 have a width of 50 microns, it is desirable that the conformal layer 23 should have a thickness of 5 microns or less. However, even thicker layers will conform substantially to the profile of the display elements 21, thus achieving a similar result. Also, the conformal layer 23 of encapsulation material is optically transparent. It should also be noted that the encapsulation material can be an elastomer, for example.

After the base layer 22 and conformal layer 23 of encapsulation material harden, the encapsulation material is swelled with the plasticizer 24 in a similar manner as described above so the display elements 21 are able to rotate in their cavities 25 as in the conventional display 10. Additionally, the plasticized material can be bonded to a protective bottom sheet 26a and/or protective top sheet 26b of plastic, glass or the like on the top and/or bottom of the display 20. If a protective top sheet 26b is provided over the top of the conformal layer 23, the protective top sheet 26b is preferably conformal, otherwise, the sheet 26b will specularly reflect light.

The conformal layer 23 of encapsulation material produces a paper-like appearance of the inventive display 20. Furthermore, the conformal surface of the display 20 does not produce any specular reflection. Instead, light 27 incident upon the display 20 diffusely reflects off the conformal layer 23 of the encapsulation material 22 because the conformal layer 23 of the encapsulation material forms a rough upper surface. As such, the diffusely reflected light 28 is scattered off the conformal layer 23 producing no glare and allowing a viewer to comfortably view the display 20 at I without having to reposition his head.

Figure 3:
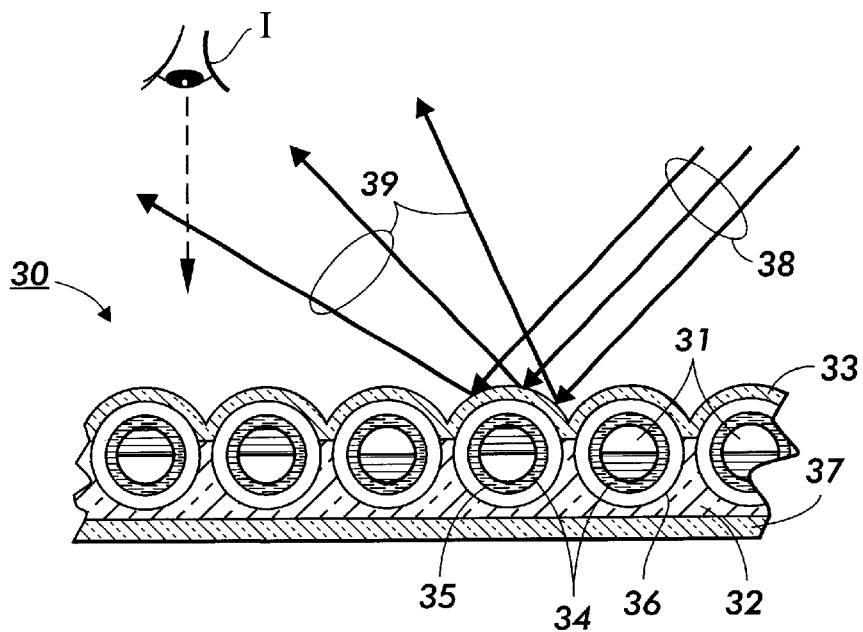
FIG. 3 is a cross section of another embodiment of the visual display in accordance with the invention.

FIG. 3 shows another embodiment of the display 30 according to the invention where, as disclosed in U.S. Pat. No. 5,604,027, the display 30 can have rotating display elements 31 that use a separate encapsulating shell 36 to enclose both the rotating display elements 31 and a sufficient thickness of the dielectric fluid 34 to allow free rotation of the rotating display elements 31 in their cavities 35. The display elements 31 are disposed on a base layer 32 of encapsulation material and packed close together in a monolayer to provide excellent brightness characteristics such that each display element 31 is partially immersed in the material 32 and has an exposed top surface. A substantially thin conformal layer 33 of encapsulation material is deposited over the exposed surface of the display elements 31 similar to the display depicted in FIG. 2 such that the conformal layer 33 conforms to the encapsulating shells 36 so light 38 incident upon the display 30 diffusely reflects off the conformal layer 33 of the encapsulation material. The diffusely reflected light 39 is scattered off the conformal layer 33 producing no glare and allowing a viewer to comfortably view the display 30 at I without having to reposition his head. Additionally, once the encapsulation material is plasticized, the plasticized material can be bonded to a protective sheet 37 of plastic, glass or the like as explained above for the display 20.

Figure 4:
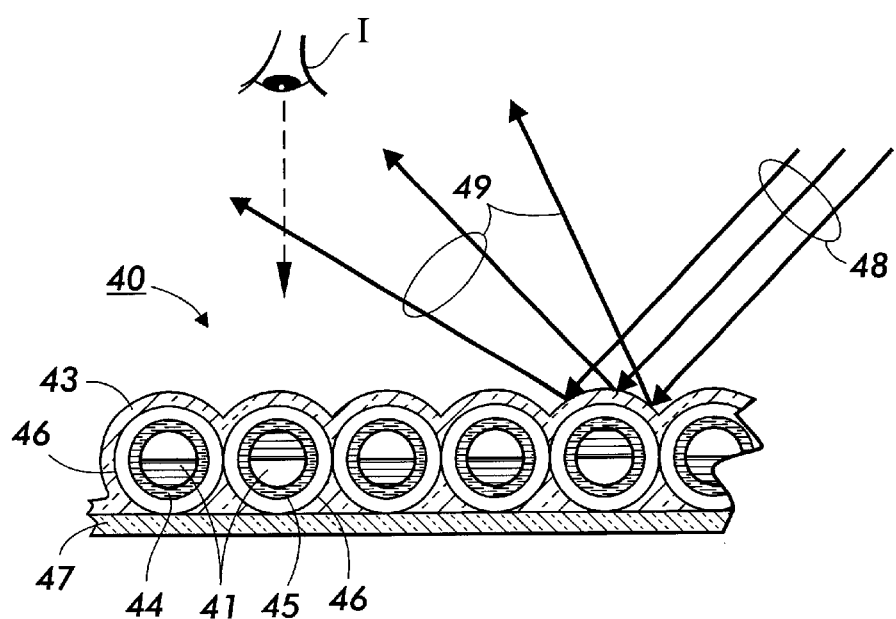
FIG. 4 is a cross section of another embodiment of the visual display in accordance with the invention.

FIG. 4 shows another embodiment of the display 40 according to the invention where the display 40 has separate encapsulating shells 46 bonded directly to the protective sheet 47 without being placed in a base layer 32 of encapsulating material as shown in FIG. 3. The shells 46 are bonded directly to the sheet 47 by any known or subsequently developed adhesive, by heating, or any known or subsequently developed bonding technique.

A substantially thin conformal layer 43 of encapsulation material is deposited over the encapsulating shells 46 such that the conformal layer 43 conforms to the encapsulating shells 46. Therefore, light 48 incident upon the display 40 diffusely reflects off the conformal layer 43. The display elements 41 and dielectric fluid 44 within cavities 45 are contained in the shells 46. The diffusely reflected light 49 is scattered off the conformal layer 43 producing no glare and allowing a viewer to comfortably view the display 40 at I without having to reposition his head.

Figure 5:
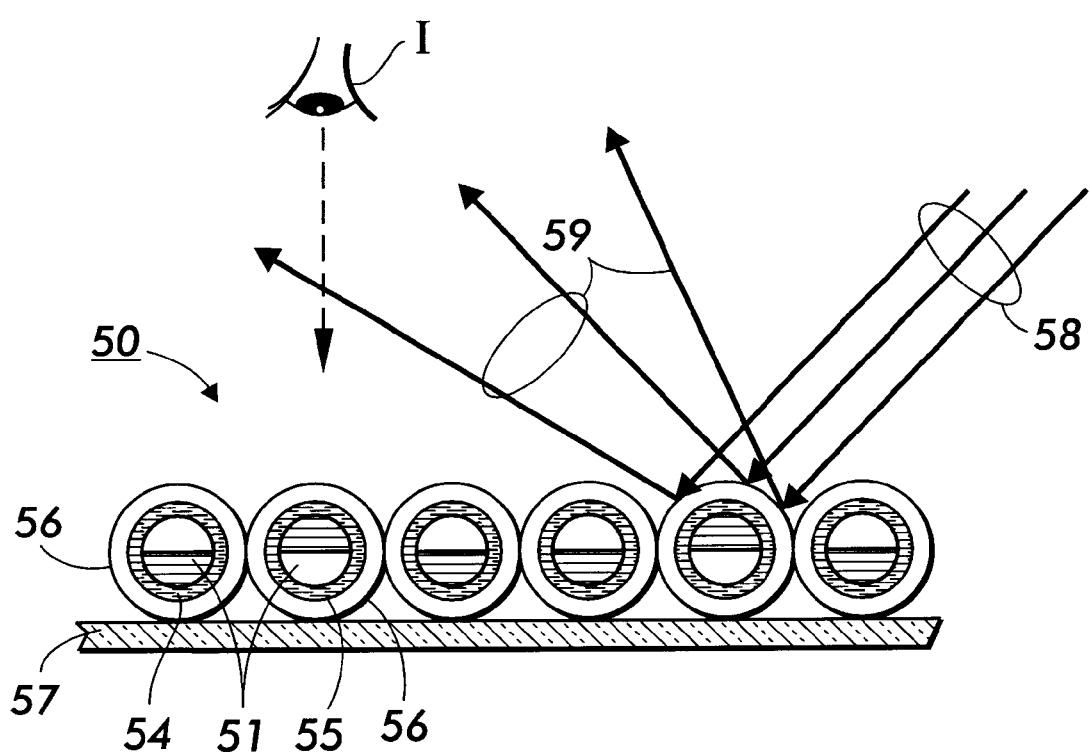
FIG. 5 is a cross section of yet another embodiment of the visual display in accordance with the invention.

FIG. 5 shows yet another embodiment of the display 50 according to the invention where the encapsulated shells 56 are bonded directly to the protective sheet 57 without an encapsulation layer. The display elements 51 and dielectric fluid 54 within cavities 55 are contained in the shells 56. Since the encapsulated shells 56 have a similar shape (conformal) as the rotating display elements 21, 31, 41, and 51, light 58 incident upon the display 50 diffusely reflects off the non-flat surface of the shells 56. The diffusely reflected light 59 is scattered off the shells 56 producing no glare and allowing a viewer to confortably view the display 50 at I without having to reposition his head.

Although the display elements 21, 31, 41, and 51 discussed above are depicted in FIGS. 2–5 as being spherical, it is understood that the display elements 21, 31, 41, and 51 are not limited to the illustrated configuration, but are represented as such merely for explanatory purposes. As such, in another embodiment of the display 20, 30, 40, and 50 according to the invention and as disclosed in U.S. patent application Ser. No. 08/960,865, the display can have cylindrical, rather than spherical display elements. The display elements can be bichromal or polychromal cylinders aligned parallel to one another. As evident by the displays 30, 40, and 50 shown in FIGS. 3–5, such a configuration provides excellent brightness characteristics as well as relative ease of manufacture.

In yet another embodiment of the &splay 20, 30, 40, and SO according to the invention and as disclosed in U.S. patent application Ser. No. 08/960,868, the displays 20, 30, 40, and 50 can have rotating cylindrical elements with multiple chromatic values.

To ensure the optimum level of color saturation, if the display elements are colored, and to improve overall image quality of the visual display 20, 30, 40, and 50 each layer of color should appear as complete to an observer as possible. Several methods are known in the art for obtaining optimum area coverage. For example, such packing methods are described in U.S. patent application Ser. No. 08/713,935; U.S. patent application Ser. No. 08/713,936; U.S. patent application Ser. No. 08/716,675; and U.S. patent application Ser. No. 08/713,325.

In yet another embodiment of the display 20, 30, 40, and 50 according to the invention, the display 20, 30, 40, and 50 in any of the above embodiments can be an electrophoretic display device, such as that described in the article entitled "A Stylus Writable Electrophoretic Display Device" authored by A. Chiang, D. Curry and M. Zarzychi and published in SID Digest 79, pp. 44–45, which is incorporated herein by reference. In such an embodiment, the conformal layer conforms to an exposed outer surface of electrophoretic display elements, which can be sacs or other such elements so that light incident upon such a display diffusely reflects off the conformal layer of the encapsulation material.

While the invention has been described in conjunction with specific embodiments thereof, it is evident that many alternatives, modification and variations may be apparent to those skilled in the art. For example, one or both of the protective sheet 26a, 26b, 37, 47, and 57 and the conformal layer 23, 33 and 43 of encapsulation material can have a conductive coating or include any other conductive patterns, layers or elements for addressing the display elements 21, 31, 41, and 51. Accordingly, the specific embodiments of the invention as set forth herein are intended to be illustrative, not limiting. Various changes may be made without departing from the spirit and scope of the invention as set forth in the following claims.

What is claimed is:

1. A visual display comprising:
   a substrate;
   a plurality of rotatable display elements over the substrate, each display element having a non-flat surface; and
   an optically transparent conformal layer of encapsulation material covering and conforming substantially to at least a portion of the non-flat surface of the display elements, wherein light incident upon the conformal layer is difflusely reflected by the conformal layer.

2. The visual display according to claim 1, wherein the display elements are positioned adjacent each other to form a monolayer of display elements.

3. The visual display according to claim 1, wherein the display elements are bichromal.

4. The visual display according to claim 1, wherein the display elements are polychromal.

5. The visual display according to claim 1, wherein the display elements have a shell of a first compound to form a microcapsule.

6. The visual display according to claim 1, wherein the display elements are spherical.

7. The visual display according to claim 1, wherein the display elements are cylindrical.

8. The visual display according to claim 1, wherein the display elements are electrophoretic microencapsulated elements.

9. The visual display according to claim 1, wherein at least one of the substrate and the conformal layer includes a conductive element.

10. The visual display according to claim 1, further comprising a base layer of encapsulation material placed on the substrate, the display elements being partially immersed in the base layer.

11. A visual display comprising:

a base layer of encapsulation material on a substrate;

a plurality of rotatable display elements, each display element having a non-flat surface, partially immersed in the base layer; and an optically transparent conformal layer of encapsulation material covering and substantially conforming to at least a portion of the non-flat surface of the display elements, wherein light incident upon the conformal layer is difflusely reflected by the conformal layer.

12. The visual display according to claim 11, wherein the display elements are arranged in the base layer in a monolayer.

13. The visual display according to claim 11, wherein the display elements are one of bichromal and polychromal.

14. The visual display according to claim 11, wherein the display elements have a shell of a first compound to form a microcapsule.

15. The visual display according to claim 11, wherein the display elements are spherical.

16. The visual display according to claim 11, wherein the display elements are cylindrical.

17. The visual display according to claim 11, wherein the display elements are electrophoretic microencapsulated elements.

18. The visual display according to claim 11, wherein at least one of the substrate and the conformal layer include a conductive element.

19. A method for forming a display that difflusely reflects light incident on a surface of the visual display, comprising the steps of:

providing a plurality of rotatable display elements on a substrate, each display element having a non-flat surface; and placing a substantially thin conformal layer of encapsulation material over at least a portion of the non-flat surface of the display elements so that light incident upon the conformal layer is diffusely reflected.

20. The method according to claim 19, wherein the step of providing the display elements comprises disposing the display elements in a base layer of encapsulation material, the base layer being placed on the substrate.

21. The method according to claim 20, further comprising the steps of:

curing the base layer of encapsulation material and the conformal layer of encapsulation material such that the display elements are trapped within a slab of cured encapsulation material; and infusing the slab of cured encapsulation material with a plasticizer which is absorbed by the slab wherein the slab swells to create plasticizer-filled cavities around the display elements such that the display elements have rotational movement, but substantially no translational movement within the cured encapsulation material.

22. The method according to claim 20, wherein the step of providing the plurality of display elements comprises disposing the display elements in the base layer in a monolayer.

23. The method according to claim 20, further comprising the step of providing at least one of the substrate and the conformal layer with a conductive element.

24. The method according to claim 19, wherein the step of providing the plurality of display element comprises disposing the display elements on the substrate in a monolayer.

25. The method according to claim 19, further comprising the step of providing at least one of the substrate and the conformal layer with a conductive element.

26. A visual display comprising:

a substrate having a conductive element; and a plurality of rotatable display elements over the substrate, each display element having a shell of a first compound to form a microcapsule and the shells are positioned adjacent each other to form a monolayer of shells, wherein light incident upon a non-flat surface of each shell is difflusely reflected by the non-flat surface.

27. The visual display according to claim 26, wherein the display elements are one of bichromal and polychromal.

28. The visual display according to claim 26, wherein the display elements are one of spherical and cylindrical.

29. The visual display according to claim 26, wherein the display elements are electrophoretic microencapsulated elements.

* * * * *